United States Patent Office 3,250,737
Patented May 10, 1966

3,250,737
PREPARATION OF CONCENTRATED LATICES BY ALTERNATELY FLASHING AND CENTRIFUGING
Walter M. Halper, San Pedro, and Fred Dudley Moss, Long Beach, Calif., assignors to Shell Oil Company, New York, N.Y., a corporation of Delaware
No Drawing. Filed Aug. 21, 1961, Ser. No. 132,548
4 Claims. (Cl. 260—29.7)

This invention relates to processes for producing latices of synthetic elastomers. More particularly, it relates to improved processes for producing concentrated latices of synthetic elastomers from hydrocarbon solutions of the said synthetic elastomers.

The art and technology relating to latices of synthetic polymers is, of course, highly developed. In the prior art, synthetic elastomers are commonly prepared by emulsion polymerization techniques whereby the resulting product at the end of the polymerization is an emulsion wherein the solids content varies depending upon the particular art and technology involved. Thus, for example, synthetic elastomers of the type represented by styrene-butadiene copolymers are suitably prepared by emulsification polymerization in the presence of water and emulsifying agents so that the resulting product is an aqueous emulsion of the copolymer together with unreacted monomers. The copolymer may be ultimately separated upon the addition of salt and acid whereupon there results a crumb of the rubber which is then easily separated from the aqueous phase. Synthetic latex, as distinguished from crumb, is highly useful in the preparation of foam, or cellular products, and the latex is obtained from the emulsion by flashing to remove the unreacted monomer and some water; the resulting product is the latex. The solids content of the latex varies depending upon the particular synthetic elastomer involved and its ultimate utility. During the concentration by flashing off some water, the emulsifying agent is mainly left behind so that the quantity of the emulsifying agent contained in the latex is regulated by the amount that is contained in the reactor during the emulsification polymerization. The emulsification polymerization processes are regulated and controlled so that stable emulsions of rather high solids content are obtained so that a lesser amount of water will need to be flashed. Flashing is necessary, however, at least in order to remove unreacted monomer.

In recent years, synthetic elastomers produced by solution polymerization methods have received much attention mainly due to advances and changes in technology. The problems of emulsifying and concentrating the emulsion to produce latices has created difficulties not heretofore experienced because material differences exist not only because the elastomers are different but also because the solutions of these elastomers have very different rheological properties and characteristics. This will become more apparent as this description continues.

It is an object of this invention to provide improved processes for the preparation of concentrated latices. More particularly, it is an object of this invention to produce concentrated latices of synthetic elastomers from organic solutions thereof. It is yet another object of this invention to produce such latices by processes which are rapid, efficient and economical. Other objects will become apparent as the descritpion of this invention proceeds.

These and other objects are accomplished by the process for producing a latex of a synthetic elastomer comprising mixing a solution of a synthetic elastomer in an organic solvent, water and an emulsifying agent, homogenizing the mixture at least until the resulting emulsion is stable, stripping the organic solvent at elevated temperatures and pressures below conditions at which water boils, centrifuging the resulting dilute aqueous latex, recovering and recycling the aqueous serum from the said centrifuging step and recovering the concentrated latex. By this process, several new techniques and advances are provided for the preparation of latices of synthetic elastomers. Because the synthetic elastomers are contained in organic solvent, the stripping step is employed to remove the organic solvent. Any unreacted monomer that may be present is also removed although the system may be essentially free of unreacted monomer as the polymerization can be so controlled as to effect near total conversion of the monomer. A particularly important modification, which is mentioned here preliminarily, is the step of partially stripping the organic solvent, followed by centrifuging after which additional stripping is undertaken followed by a further centrifuging. While this alternative procedure ultimately accomplishes the same result, it has the advantage of increasing the throughput rate and thereby affords substantial economy, particularly in regard to the cost of apparatus.

THE SYNTHETIC ELASTOMER

The processes of this invention are applied to any synthetic elastomer that is in the form of a hydrocarbon solution before emulsification begins, and it is immaterial how the hydrocarbon solution of the synthetic elastomer is obtained. In the more preferred embodiments, the processes of this invention are applied to synthetic elastomers prepared by solution polymerization methods wherein an organic diluent is used as a combined solvent and diluent. Butadiene and isoprene are representative of dienes that are polymerized by solution polymerizations using the so-called "low pressure" polymerization methods wherein the polymerization catalyst may be the reaction product of a halide of a transition metal within Groups IV–VIII of the Periodic Table and a reducing agent such as an aluminum alkyl, aluminum alkyl halide, aluminum hydride, and the like. Lithium alkyls alone or in combination with lithium metal are also suitable polymerization catalysts for dienes. Thus, polybutadiene having a cis-1,4-content as high as about 98% may be obtained as well as polybutadiene having an essentially all trans-1,4-content. Polyisoprene which is essentially free of gel and free of branching may also be obtained with these low pressure catalysts by means known in the art. Another class of synthetic elastomers are the copolymers prepared from ethylene and one other monoolefin having up to 8 carbon atoms such as the elastomeric copolymer of ethylene and propylene, the copolymer of ethylene and butene-1, and the like. Elastomeric terpolymers prepared by solution polymerizations are also equally suitable for the purposes of the present invention and one such terpolymer is that obtained from ethylene, propylene, and a diene such as 1,5-hexadiene, prepared by polymerizing a mixture of monomers with a catalyst that may be the reaction product of a reducing agent of the kind indicated above and a vanadium compound such as vanadium halides, vanadium oxyhalides, vanadium esters, and the like. In all these cases, the diluent is a solvent such as pentane, hexane, amylene, benzene, halogenated derivatives thereof, and the like.

Persons skilled in the art will immediately recognize that these elastomers comprise those that are of relatively recent origin. These elastomer solutions are further characterized by very high viscosity although the elastomer content is relatively low. Thus, the solids content of the elastomer solution at the end of the polymerization rarely exceeds 25% by weight and, in fact, at such concentrations difficult material handling problems are presented so that the solutions usually contain in the order of 5 to less than 25% by weight of elastomer. When the elastomer solution is emulsified, the solids content is substantially less, and it is because of the low solids content that concentration by prior art methods, i.e., flashing of water, becomes wholly unsuitable. The invention, however, is not critically limited to elastomers prepared by the "low pressure" processes and any elastomer produced by solution polymerizations may also be the subject of the present invention, and polyisobutylene is representative of one such elastomer. Alternatively, elastomers that are in solid form may be dissolved or redissolved after preparation by other means. When used within this specification, the term "synthetic elastomer" makes reference to synthetic elastomers defined according to ASTM Special Technical Publication No. 184, page 138, wherein the elastomer is further characterized as being essentially completely soluble in an organic solvent. In any case, the preparation of the synthetic elastomers form no part of this invention.

THE EMULSIFICATION

The emulsification of the elastomer solution comprises bringing together water, a surface active agent usually in the form of an aqueous solution and the organic solution of the elastomer in suitable homogenizing apparatus. The apparatus which is employed is not particularly critical but it should be so selected as to be sufficiently adaptable to emulsify elastomer solutions wherein the elastomer may vary from batch to batch. In this regard, a centrifugal pump with a variable speed control and/or a bypass is found to be quite suitable although other homogenizing apparatus will also be suitable.

It will be found that the maximum throughput rate through particular emulsifying apparatus can be substantially increased if the concentration of the polymer in the organic solvent is not too high, but the particular concentrations will depend very largely on the species of elastomer and solvent involved. Thus, in the case of a cis-1,4-polyisoprene solution in an aliphatic diluent such as isopentane, amylene, pentane and the like, suitable throughput rates are experienced at concentrations in the order of 12–16% by weight, but much faster throughput rates are experienced if the concentration is maintained in the order of 8 to 10% by weight. On the other hand, if the concentration is too low, the cost of separating the additional solvent will offset the higher throughput rate.

The amount of emulsifying agent employed depends on such factors as the particular synthetic elastomers being emulsified, the emulsification apparatus, the choice of the emulsifying agent, the concentration of the elastomer solution, and similar variables. A principal advantage of the present invention is that any excess over the minimum amount of emulsifying agent that may be needed to produce a stable emulsion may be employed because the excess is ultimately recovered and reused so that no loss of excess emulsifying agent is incurred. Generally, the minimum amount of emulsifying agent needed for emulsification ranges from about 5.0 to 30.0 parts per hundred rubber (phr.) but the amount that is contained in the concentrated latex is always considerably lower than the 30.0 parts and will vary depending upon the particular elastomeric latex that is being prepared but amounts from about 1 to 3 phr. are fairly representative. Any of the emulsifying agents employed in the emulsion polymerization art may suitably be employed for the purposes of the present invention and there are numerous suitable emulsifying agents available commercially. The more preferred emulsifying agents are sodium or potassium soaps of rosin acids and/or fatty acids such as oleic acid, palmitic acid, stearic acid, lauric acid, myristic acid, arachidic acid, castor acid, similar acids and other anionic emulsifying agents. These soaps are found to cause less foaming during the subsequent stripping operations and are found to produce highly stable emulsions. However, other emulsifying agents may be employed and it makes little difference whether they are cationic or nonionic providing they are water soluble. Among the cationic surface active agents there may be mentioned the amine salts such as hydroxyl amines of long chain fatty acid esters, quaternary ammonium salts as tridecylbenzene hydroxyl ethyl imidazolinium chloride and stearyldimethylbenzyl ammonium chloride, and the like. Nonionic surface active agents are represented by the phosphoric esters of higher alcohols such as capryl and octyl alcohol, monoesters of oleic acid and pentaerythritol, sorbitan mono-oleate and the like.

As previously indicated, the emulsifying agent is preferably added in the form of an aqueous solution and desirably in concentrations in the order of about 0.5 to 2% in the aqueous phase. It will be appreciated that the concentration is not particularly controlling as the total amount of the emulsifying agent is more important. The amount of water contained in the total composition for emulsification may range from 75 to about 300 parts per hundred of elastomer solution with amounts in the order of 125 to 175 being preferred.

It will be readily appreciated that emulsification procedures may be varied. Thus, the emulsifying agent may be prepared in situ by adding the soap forming acid to the elastomer solution and adding an alkali metal hydroxide to the aqueous phase. The reaction of the alkali metal hydroxide and soap forming acid occurs during emulsification. If desired, all the ingredients that are to be emulsified may be charged to a single reactor which is under constant agitation, and the blend may then be continuously fed to the emulsifying apparatus. Alternatively, the water, solution of emulsifying agent, and elastomer solution may be fed by separate inlets into the emulsifying apparatus in the desired proportions and the resulting aqueous emulsion is recovered and stored for subsequent processing.

As previously indicated, the aqueous emulsion of the synthetic elastomer should be stable in order to produce a more desirable latex. Emulsions that are not stable are characterized by the separation of the emulsion into two layers and this will become readily apparent if a specimen is permitted to stand for a short period of time. The stability of the emulsion depends largely on the average particle size of the rubber phase and the size is most simply controlled by adjusting the concentration of the emulsifier in the aqueous phase in relation to the rubber-hydrocarbon phase. The particle size may also be decreased by reducing the throughput rate through the emulsification apparatus and/or increasing the degree of external recycle around the homogenizing apparatus. These measures may be undertaken alone or in combinations of varying the amount of emulsifying agent and the concentration of the elastomer solution. The resulting product from the emulsification will contain in the order of 3 to 15% solids, depending on the amount of water used, with amounts in the order of 5 to 10% being more preferred for reasons of overall efficiency and economy.

THE DILUTE LATEX

The dilute latex is the resulting product after the organic diluent has been separated from the aqueous emulsion. Separation is suitably accomplished by stripping at elevated temperatures and preferably at reduced pressures. It will be appreciated that the solvent and elastomer, prior to stripping, are in a single phase in the form of a solution. Stripping the solvent from the emulsion has the effect of reducing the size of the swollen rubber particles until all the solvent is evaporated. The residue from the vaporization is water, soap and elastomer which may or may not contain solvent depending upon the extent to which stripping has taken place. Any residual monomer or monomer that remains unpolymerized will also be removed during the stripping and the amount of monomer will vary depending on the species involved, whether batch or continuous processes are used and similar conisderations. For example, unreacted monomers from the preparation of elastomeric ethylene-proylene copolymer likely would be vented prior to stripping so that the elastomer solution would contain very little monomer. On the other hand, where the monomers have higher boiling points, the elastomer solution may contain as much as 50% of the original monomer, and maybe even more. There very likely will be some foaming during stripping and the foam may be handled by any conventional procedure except that the use of anti-foaming agents is not usually recommended, particularly if the resulting latex is to be used in the preparation of foam products. One method of handling the foam is to permit it to be carried over with the evaporating solvent after which the foam is contacted with a cold surface which causes it to collapse. By this method foam breaking is accomplished by condensation of the organic phase. The resulting dilute latex and solvent may then be separated by a settling process and the recovered organic solvent is removed.

A particularly preferred method of conducting the stripping is to use a plurality of stripping vessels wherein progressively smaller amounts of diluent are separated from each of the strippers. For example, in the first stripping perhaps in the order of 50–85% of the solvent may be removed and in the subsequent strippers lesser amounts may be removed until, in the last stripper, all the remaining organic solvent is separated. By suitably adjusting the feed rate and the evaporating conditions, foaming during the stripping operation can be easily confined to the first stripper, and this is a particularly suitable method of procedure. In a more preferred procedure, three strippers are used wherein about 60–80% of diluent is removed in the first, about 35 to 15% is removed in the second and the remainder removed in the last.

The product at the termination of the stripping is a dilute latex that is essentially free of organic solvent and contains the synthetic elastomer as a dispersion in water and soap. The solids content, i.e., the rubber content, will vary a great deal depending upon the variables previously described. Generally, the rubber content is quite low and may be in the order of 5 to 10% by weight. The average particle size of the rubber in the dilute latex is smaller since the organic solvent, which was present previously, had the effect of swelling the elastomer particles. The dimensions of the rubber particles are not important since stability of the dilute latex is assured if the emulsion was stable.

It was previously indicated that a particularly advantageous alternative procedure of the present invention comprises one or more concentrations between the plurality of stripping steps. Such concentrations operate to increase considerably the throughput rate through the final concentration step. This will be described more fully hereinafter, but it is desired to point out that it is during the preparation of the dilute latex that the preliminary concentrations may take place.

CONCENTRATED LATEX

The dilute latex from the previous step is concentrated by the separation of water and soap by centrifuging to produce the concentrated latex. The specifications of the centrifuge is easily determined based on the required throughput rate and the solids content required of the concentrated latex. These, in turn, depend largely on the species of synthetic elastomer involved and its ultimate utility. The selection of a centrifuge is of considerable importance because the throughput rate must be sufficiently high for commercial operations and centrifuges of commercial design are very expensive. Because of the cost factor, any procedure which will increase the throughput without requiring an additional number of centrifuges is of considerable benefit and it is for this reason that the preconcentration between stripping steps is highly beneficial. A disadvantage of the preconcentration procedure is that at least two centrifuges are required, and this may be a substantial cost deterrent to this method of procedure. Furthermore, if two centrifuges are used, it may be necessary to have available a third centrifuge in reserve. Thus, the technique of preconcentration is a matter that will be governed, to a large extent, by the economics of plant design, in conjunction with production requirements.

The procedure of concentrating the latex by centrifuging is required in the present processes because the emulsification of the elastomer solutions requires such large amounts of water so that the dilute latex also contains large amounts of water. In the art relating to emulsions and latices obtained by emulsion polymerizations the rubber content at the end of the emulsification is much higher so that concentration by flashing water is economical. In the present processes flashing is wholly unsuitable, as a practical matter, because the heat requirements and flashing apparatus needed to separate the water would be prohibitive. Of considerable importance is the fact that the preparation of stable, strippable emulsions from solutions of elastomers requires rather large amounts of emulsifying agent. The amount of emulsifying agent must, however, be greatly reduced in order to produce a suitable concentrated latex. Concentration by centrifuging permits rejection of excess emulsifying agent while also allowing recovery and reuse of the excess. This will be more readily seen from the examples. The solids content of the latex is of considerable importance when the latex is to be used for the preparation of dipped goods and vulcanized foam and this also is easily controlled by the extent of centrifuging. When the latex is to be employed as an intermediate for the recovery of the rubber by coagulation, the solids content and content of emulsifying agent are of lesser importance. The required solids content of the concentrated latex will vary, as above, depending on such factors as the elastomer species, the species of emulsifying agent and the ultimate utility. Generally, the solids content of the latex should be in the order of about 55% to 75%, by weight, with about 60% to 70% being more preferred in all cases. For cis-1,4-polyisoprene latex, it is most preferred that the solids content be in excess of about 62%; for cis-1,4-polybutadiene the solids content may be considerably less and still be acceptable, but in no case should the solids content be below about 55%, by weight, when the latex is to be used for the preparation of vulcanized foams or dipped goods as inferior products result. It is preferred to have the solids content as high as is consistent with overall economical procedure. As the solids content increases, the specifications of the centrifuging apparatus become more demanding. At about 75% solids, the cost of apparatus and time in centrifuging may become uneconomical and about 70% by weight is found to be a suitable and feasible maximum.

A suitable centrifuge is represented by the Sharples Model DF–2M having a 14-inch bowl which develops a centrifugal force of about 10,000 G's at the periphery. A machine having almost five times the capacity is the De Laval centrifuge, Model SRG–214 with a 24-inch bowl, even though it develops a centrifugal force of only about 6,000 G's at the periphery. This centrifuge, however, costs about twice as much. There are many other centrifuges that may be employed. An advantage of this invention is that the high content of emulsifying agent in the serum is utilized by recovering and recycling it to the vessel for emulsifier makeup. The small amount of elastomer that may be contained in the serum is not sufficient to require any particular effort for its separation. If there is too much elastomer in the serum then it would be better to reduce the centrifuging rate rather than processing it with recycled emulsifying agent. The concentration of emulsifying agent in the final concentrated latex, as previously indicated, usually will be in the order of about 1.0 to about 3.0 parts per hundred of elastomer.

Instead of separating the organic solvent in a direct series of flashings, it is particularly advantageous for the first flashing to be followed by a preconcentration by centrifuging. Thereafter the subsequent flashings and final concentration takes place. Alternatively each flashing step may be followed by a preconcentration by centrifuging. By employing a single preconcentration after the first flashing the throughput rate may be increased by as much as five times, and this will be described more fully in the examples. The solvent is recovered and the aqueous phase may be recycled to the emulsifying makeup vessel. The amount of solvent in the rubber-solvent phase contained in the feed for the preconcentration is not critical and will vary depending on the stripping conditions, nature of solvent and similar variables. However, it is found to be more efficient if the stripping conditions are adjusted so that the feed for the preconcentration contains about equal parts, by weight, of solvent and elastomer solids.

The centrifuging technology is governed by Stokes' law wherein the particle size, the difference in density between the continuous and the dispersed phase, the viscosity of the continuous phase, and the centrifugal field developed by the centrifuge are all a function of the capacity so that various modifications of the concentration techniques described above will be more readily apparent to persons skilled in the art.

Example I

Into a high speed centrifugal pump operated at about 3500 r.p.m. is fed, at 0.7 g.p.m., a stream of a 10% solution by weight of 92% cis-1,4-polyisoprene (I.V. 10.0 dl./g.) in amylene containing 0.8 phr. of rosin acid. At the same time, an aqueous stream containing recycle potassium rosinate (10.0 phr.), water (2200 phr.) and potassium hydroxide (0.2 phr.) is fed at the rate of 1.0 g.p.m. There results a coarse emulsion which is further emulsified in an Eppenbach pipeline homogenizer to form a stable emulsion. The emulsion is then stripped in a pressure flash vessel at 110° F. and 3.0 p.s.i.g. The dilute latex contains 4% by weight of elastomer and has a potassium rosinate content of 11 phr. The resulting dilute latex is passed through a centrifugal separator until the elastomer content is about 60% by weight and the soap content is reduced to about 2 parts per hundred of elastomer.

Example II

For this run 92.5% cis-1,4-polyisoprene of I.V. 8.0 dl./g., contained in mixed amylene as a 12.5% by weight solution, is emulsified with a 1.5% by weight aqueous solution of potassium rosinate. The soap solution and the elastomer solution are fed into an emulsification pump in approximately equal volumes. The emulsification pump has a 9 inch impeller rotating at 3500 r.p.m. The resulting emulsion contains about 4.9% by weight of elastomer as a stable emulsion. The emulsion also comprises about 33.5% solvent, 60.7% water and the balance is the emulsifier. Thereafter the feed passes into three subsequent stripping vessels wherein the approximate feeds, in parts by weight, are as follows:

|  | 1st | 2d | 3d |
|---|---|---|---|
| Elastomer | 4.9 | 8.2 | 8.8 |
| Solvent | 33.5 | 8.2 | 1.0 |
| Water | 60.7 | 82.4 | 88.9 |
| Emulsifier | 0.9 | 1.2 | 1.3 |

The resulting dilute latex, which is essentially free of solvent, contains about 9.1% elastomer, 89.5% water and 1.4% emulsifier. The dilute latex is then concentrated in a De Laval centrifuge, Model SRG-214, having a 24 inch bowl and a 15 H.P. motor, until the solid content is from about 67-70%, by weight, with the balance being water and emulsifying agent. Again, the product is essentially free of solvent. The serum from the centrifuging step, containing about 1.3% by weight of emulsifying agent, is recycled to a storage vessel where it is prepared for reuse. The serum may also contain from about 1-2% by weight of elastomer although it is preferred to adjust the centrifuging rate so that the serum contains at least less than about 1% by weight.

Example III

Instead of flashing all the solvent in a single stripping operation followed by centrifuging as in Example I, or flashing in the plurality of strippers in series before concentrating as in Example II, the emulsion of Example II is stripped to 100 parts of solvent per 100 parts of the emulsified polyisoprene in the first stripper. The partially stripped emulsion is then centrifuged until the hydrocarbon-elastomer content is about 60% by weight after which the remaining solvent is stripped and the latex recentrifuged until the solids content is 60%. The suspended rubber particles after the first flashing have an average diameter of 1.34 times the diameter of the solvent-free elastomer, i.e., that in the dilute latex. This is because the solvent operates to swell the particles and thereby increases the size of the particles. Similarly, the density of the swollen polymer is lower and in this case amounts to 0.7 times that of the dilute latex. It is found that the throughput rate is increased about 370% to reach a final solids content of about 60%. The theoretical increased throughput rate, according to Stokes' law is about 500%. The solvent removed by the flashings and the emulsifying agent from the centrifuging are recovered and returned to a suitable vessel for subsequent processing and reuse.

In the above examples, comparative runs are conducted with various soaps and, it is found that the above-mentioned preferred class of emulsifying agents results in substantially less foaming during stripping while also producing a latex which ultimately results in highly suitable vulcanized foams.

Example IV

The procedures of Example III are repeated except that in this experiment the elastomer is prepared from a 20% by weight solution of butadiene in benzene. The polymerization product contains about 15% of 98% cis-1,4-polybutadiene dissolved in benzene and also contains some butadiene as the polymerization is conducted to about 60% conversion. Emulsification is accomplished in the same way using potassium rosin soaps as a 1.5% aqueous solution. Flashing is accomplished in a series of strippers wherein the first stripper is operated at conditions whereby about 60% of the benzene is removed. A preconcentration then follows after which two additional flashing operations are undertaken to remove the remaining benzene solvent, followed by a final centrifuging until the solids content reaches about 62.5%. The serum from the centrifuging steps is recovered for reuse.

The same solids content is obtained without a preconcentration except that the throughput rate is about four times longer.

Example V

For this experiment the procedure of the preceding examples are repeated except that the elastomer is the copolymer of ethylene and propylene dissolved in pentane wherein the ethylene content is about 72 mole percent. The copolymer is prepared according to the procedures described in Belgian Patent 583,039. As it happens, the copolymer is more desirable for vulcanized foams when the solids content of the latex is in the order of about 70% by weight. In order to obtain the higher solids content, the first and second centrifuging may require more time and this has the effect of reducing the throughput rate. In this case, the first stripping is operated to remove about 45% of the solvent, the second removes about 40% and the last removes the balance. The serum from the first and second centrifuging may be usefully combined and recycled to reuse the emulsifying agent.

*Example VI*

For this experiment a latex of 62% solids is prepared from a heptane solution of a terpolymer of ethylene, propylene and hexadiene-1,5 prepared according to the procedures of U.S. Patent 2,933,480. Emulsification is as described above, but it is noted that a mixture of potassium rosinate and potassium stearate function as a more suitable emulsifying agent. Additionally the concentrated latex is suitable when the solids content is as low as 58%, by weight. For this reason, an adequate procedure is a single preconcentration although higher solids are more preferred. In any case, the serum from the preconcentration is recycled for reuse of the emulsifying agent contained therein.

The present invention provides the greatest advantage for the preparation of concentrated latices from dilute latices and aqueous emulsions wherein the solids content in the emulsion is rather low, i.e., in the order of less than 15% by weight. More usually, however, the solids content will be in the order of 5 to 10% by weight. The emulsions are further characterized in that they may be free of unreacted monomers as it is sometimes desirable to carry the polymerizations to essentially complete conversion of the monomer rather than recovering unreacted monomer for reuse. Polymeric latices prepared from emulsions prepared by emulsification polymerization, on the other hand, contain substantial amounts of unreacted monomers which are removed together with some water during stripping. The removal of water by stripping, of course, requires higher temperatures and far lower pressures but this high cost is offset by the much higher solids content in the emulsion so that not nearly as much water needs to be removed. Still further, since emulsification polymerizations employ emulsifying agents from the beginning of the polymerization, there usually is no need to reduce the level of emulsifying agent as in the present case which employs substantial amounts of emulsifying agent in order to produce an emulsion from the elastomer solution.

The processes of the present invention may be modified in numerous respects. Thus, the centrifuging operations may be modified by the use of various techniques employed to improve efficiency and throughput rate. However, the reuse of the soap serum for emulsification and the exacting requirements for the ultimate use of the latices will limit the possible use of additives to the centrifuge. This is particularly the case when the process is geared for continuous operations. It will also be appreciated that the process is quite suitable for the preparation of mixed latices in which event it is better to prepare a mixture of emulsions, strip the solvent and then carry out the concentration. This process, however, requires that the emulsifying agent be the same or at least compatible for both emulsions. If desired, the emulsion may be processed while containing ingredients that may be needed for subsequent processing. Thus, when foamed products are to be prepared, vulcanizing agents, as sulfur, accelerators, zinc oxide, fillers, pigments and materials of a similar nature may be added to the emulsion or dilute latex and before the concentration step is undertaken. Still other modifications will be readily apparent to persons skilled in the art.

We claim as our invention:

1. The process for producing a concentrated latex comprising emulsifying a mixture of water, emulsifying agent and solution of a synthetic elastomer dissolved in an organic solvent in an amount ranging from 5 to 25% by weight of elastomer, stripping the organic solvent from the emulsion at elevated temperatures and pressures below conditions at which water boils by a plurality of flashings wherein each flashing removes progressively lesser amounts of solvent, the said emulsion containing from 3 to 15% by weight of elastomer, from about 5 to 30.0 phr. of an emulsifying agent, from about 300 to 1900 phr. of an organic solvent for the elastomer and about 500 to 3500 phr. of water, the first flashing being followed by a preconcentration by centrifuging and a final centrifuging following the last flashing, recovering and recycling the aqueous phases from the centrifuging steps, the said aqueous phases including emulsifying agent and less than a total of 2% by weight of elastomer, and recovering the concentrated latex from the final centrifuging wherein the solids content ranges from about 55 to about 75% by weight of elastomer.

2. The process of claim 1 wherein the feed to the preconcentration is composed of about equal parts by weight of organic solvent and elastomer solids.

3. The process of claim 1 wherein the elastomer is predominately the cis-1,4-addition product of polyisoprene.

4. The process of claim 1 wherein the elastomer is predominately the cis-1,4-addition product of polybutadiene.

References Cited by the Examiner

UNITED STATES PATENTS

| | | | |
|---|---|---|---|
| 2,451,332 | 10/1948 | Green | 260—29.7 |
| 2,799,662 | 7/1957 | Ernst et al. | 260—29.7 |
| 2,936,295 | 5/1960 | Broadkey et al. | 260—29.7 |
| 2,947,715 | 8/1960 | Charlet et al. | 260—29.7 |
| 2,953,556 | 9/1960 | Wolfe et al. | 260—29.7 |

OTHER REFERENCES

Whitby: "Synthetic Rubber," John Wiley & Sons, Inc., N.Y., 1954, pp. 562, 653 and 658.

MURRAY TILLMAN, *Primary Examiner.*

LEON J. BERCOVITZ, *Examiner.*

E. B. WOODRUFF, J. ZIEGLER,
*Assistant Examiners.*